(12) United States Patent
Heikkila et al.

(10) Patent No.: US 11,518,072 B2
(45) Date of Patent: Dec. 6, 2022

(54) AUTOMATED MANUFACTURING METHOD AND SYSTEM AND IN-MOLD COATED PLASTIC ARTICLE PRODUCED THEREBY

(71) Applicant: Global IP Holdings, LLC, Sterling Heights, MI (US)

(72) Inventors: Christopher A. Heikkila, Washington Township, MI (US); Steven A. Mitchell, Linden, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 0 days.

(21) Appl. No.: 17/109,330

(22) Filed: Dec. 2, 2020

(65) Prior Publication Data
US 2022/0168927 A1    Jun. 2, 2022

(51) Int. Cl.
*B29C 43/58* (2006.01)
*B32B 5/18* (2006.01)
(Continued)

(52) U.S. Cl.
CPC .......... *B29C 43/58* (2013.01); *B29C 37/0025* (2013.01); *B29C 43/021* (2013.01);
(Continued)

(58) Field of Classification Search
CPC ....... B29C 43/183; B29C 43/18; B29C 45/14; B29C 45/14688; B29C 2045/14729
See application file for complete search history.

(56) References Cited

U.S. PATENT DOCUMENTS

| 4,692,108 A | 9/1987 | Cesano |
| 5,324,384 A | 6/1994 | Spengler |
| (Continued) | | |

FOREIGN PATENT DOCUMENTS

WO    2010080967 A1    7/2010

OTHER PUBLICATIONS

Stokes, Vijay K.. (2020). Introduction to Plastics Engineering (2020 Edition)—9. Introduction to Polymers. John Wiley & Sons. Retrieved from https://app.knovel.com/hotlink/pdf/id:kt012ESJYH/introduction-plastics/introduction-polymers (Year: 2020).*
(Continued)

*Primary Examiner* — Galen H Hauth
(74) *Attorney, Agent, or Firm* — Brooks Kushman P.C.

(57) ABSTRACT

An automated manufacturing method and system and in-mold coated plastic article produced thereby are provided. The system includes a combination compression and injection mold and a plurality of program-controlled manipulators. An automatic sprayer supported on a first manipulator sprays at least a portion of a mold surface with an in-mold coating composition. An end effector supported on a second manipulator picks up a heated blank of moldable plastic sheet material from an oven and places the heated blank in the mold. An inner portion of the heated blank is forced into an article-defining cavity of the mold and into contact with at least a portion of the composition. The composition and the inner portion cure and bond to one another and a plastic compatible with the plastic of the sheet is injected into the mold so as to form the coated plastic article.

10 Claims, 5 Drawing Sheets

(51) Int. Cl.
  *B32B 27/06* (2006.01)
  *B32B 27/40* (2006.01)
  *B32B 27/32* (2006.01)
  *B29C 43/20* (2006.01)
  *B29C 43/02* (2006.01)
  *B32B 3/30* (2006.01)
  *B29C 37/00* (2006.01)
  *B29L 31/30* (2006.01)
  *B29K 23/00* (2006.01)
  *B29C 43/34* (2006.01)
  *B29K 75/00* (2006.01)
  *B29K 105/04* (2006.01)
  *B29C 43/18* (2006.01)
  *B29C 70/42* (2006.01)

(52) U.S. Cl.
  CPC .............. *B29C 43/203* (2013.01); *B32B 3/30* (2013.01); *B32B 5/18* (2013.01); *B32B 27/065* (2013.01); *B32B 27/32* (2013.01); *B32B 27/40* (2013.01); *B29C 43/183* (2013.01); *B29C 70/42* (2013.01); *B29C 2043/3455* (2013.01); *B29K 2023/12* (2013.01); *B29K 2075/00* (2013.01); *B29K 2105/04* (2013.01); *B29L 2031/3041* (2013.01); *B32B 2266/0278* (2013.01); *B32B 2307/732* (2013.01); *B32B 2605/003* (2013.01)

(56) References Cited

U.S. PATENT DOCUMENTS

| | | | |
|---|---|---|---|
| 5,352,397 | A | 10/1994 | Hara et al. |
| 5,370,521 | A | 12/1994 | McDougall |
| 5,462,421 | A | 10/1995 | Stein et al. |
| 5,502,930 | A | 4/1996 | Burkette et al. |
| 5,506,029 | A * | 4/1996 | Hara .............. B29C 70/345 428/167 |
| 5,718,791 | A | 2/1998 | Spengler |
| 5,746,870 | A | 5/1998 | Tomioka et al. |
| 5,915,445 | A | 6/1999 | Rauenbusch |
| 6,050,630 | A | 4/2000 | Hochet |
| 6,102,464 | A | 8/2000 | Schneider et al. |
| 6,435,577 | B1 | 8/2002 | Renault |
| 6,537,413 | B1 | 3/2003 | Hochet et al. |
| 6,544,449 | B1 | 4/2003 | Gardner |
| 6,655,299 | B2 | 12/2003 | Preisler et al. |
| 6,682,675 | B1 | 1/2004 | Vandangeot et al. |
| 6,682,676 | B1 | 1/2004 | Renault et al. |
| 6,695,998 | B2 | 2/2004 | Sandefer et al. |
| 6,748,876 | B2 | 6/2004 | Preisler et al. |
| 6,790,026 | B2 | 9/2004 | Vandangeot et al. |
| 6,823,803 | B2 | 11/2004 | Preisler |
| 6,843,525 | B2 | 1/2005 | Preisler |
| 6,890,023 | B2 | 5/2005 | Preisler et al. |
| 6,981,863 | B2 | 1/2006 | Renault et al. |
| 7,090,274 | B1 | 8/2006 | Khan et al. |
| 7,419,713 | B2 | 9/2008 | Wilkens et al. |
| 7,909,379 | B2 | 3/2011 | Winget et al. |
| 7,919,031 | B2 | 4/2011 | Winget et al. |
| 8,117,972 | B2 | 2/2012 | Winget et al. |
| 8,833,829 | B2 | 9/2014 | Wenzel et al. |
| 8,986,593 | B2 | 3/2015 | Shane |
| 9,296,130 | B2 | 3/2016 | Shane |
| 9,539,745 | B2 | 1/2017 | Shane |
| 10,144,157 | B2 | 12/2018 | Shane |
| 10,166,704 | B2 | 1/2019 | Preisler et al. |
| 10,279,512 | B2 | 5/2019 | Preisler et al. |
| 2003/0194542 | A1 | 10/2003 | Springer |
| 2004/0209063 | A1 | 10/2004 | Gallagher et al. |
| 2005/0189674 | A1 | 9/2005 | Hochet et al. |
| 2006/0255611 | A1 | 11/2006 | Smith et al. |
| 2008/0090477 | A1 | 4/2008 | Balthes et al. |
| 2008/0185866 | A1 | 8/2008 | Tarrant et al. |
| 2011/0281076 | A1 | 11/2011 | Anderson et al. |
| 2011/0315310 | A1 | 12/2011 | Trevisan et al. |
| 2012/0091698 | A1 | 4/2012 | Wolfe et al. |
| 2013/0052412 | A1 | 2/2013 | Fox et al. |
| 2013/0260112 | A1 | 10/2013 | Lee et al. |
| 2013/0273191 | A1 | 10/2013 | Dooley |
| 2014/0077518 | A1 | 3/2014 | Preisler et al. |
| 2014/0077530 | A1 | 3/2014 | Preisler et al. |
| 2014/0077531 | A1 | 3/2014 | Preisler et al. |
| 2014/0225296 | A1 | 8/2014 | Preisler et al. |
| 2014/0342119 | A1 | 11/2014 | Kastell et al. |
| 2015/0027622 | A1 | 1/2015 | Kastell |
| 2015/0130220 | A1 | 5/2015 | Preisler et al. |
| 2015/0130221 | A1 | 5/2015 | Preisler et al. |
| 2015/0321396 | A1 | 11/2015 | Preisler et al. |
| 2017/0043687 | A1 | 2/2017 | Preisler et al. |
| 2017/0080617 | A1 * | 3/2017 | Gassman .......... B29C 45/14631 |

OTHER PUBLICATIONS

United States Patent and Trademark Office, Non-Final Office Action for U.S. Appl. No. 17/109,310, dated Mar. 18, 2022.
United States Patent and Trademark Office, Final Office Action for U.S. Appl. No. 17/109,310, dated Jun. 10, 2022.

* cited by examiner ically placed in an open, heated, mold cavity. The mold is then closed and pressure is applied to force the materials to fill up the entire cavity. A hydraulic ram or punch is often utilized to produce sufficient force during the molding process. The heat and pressure are maintained until the plastic materials are cured.

AUTOMATED MANUFACTURING METHOD AND SYSTEM AND IN-MOLD COATED PLASTIC ARTICLE PRODUCED THEREBY

TECHNICAL FIELD

This invention relates to automated manufacturing methods and systems and in-mold coated plastic articles produced thereby.

OVERVIEW

Compression molding has long been used to manufacture plastic parts or articles. While widely used to manufacture thermoset plastic parts, compression molding is also used to manufacture thermoplastic parts or articles. The raw materials for compression molding are typically placed in an open, heated, mold cavity. The mold is then closed and pressure is applied to force the materials to fill up the entire cavity. A hydraulic ram or punch is often utilized to produce sufficient force during the molding process. The heat and pressure are maintained until the plastic materials are cured.

Two types of plastic compounds frequently used in compression molding are Bulk Molding Compound (BMC) and Sheet Molding Compound (SMC).

In general, compression molding provides good surface finish and can be applied to composite thermoplastics with woven fabrics, randomly oriented fiber mat or chopped strand. Compression molding is thought to be largely limited to flat or moderately curved parts with no undercuts.

Thermoplastic matrices are commonplace in mass production industries e.g. automotive applications where the leading technologies are Long Fibre reinforced Thermoplastics (LFT) and Glass fiber Mat reinforced Thermoplastics (GMT).

Driven by a growing demand by industry, governmental regulatory agencies and consumers for durable and inexpensive products that are functionally comparable or superior to metal products, a continuing need exists for improvements in composite articles subjected to difficult service conditions. This is particularly true in the automotive industries where developers and manufacturers of articles for automotive applications must meet a number of competing performance specifications for such articles.

For example, automotive interior parts exposed to direct sunlight, such as instrument panels, front and rear pillar trims, parcel shelves or package trays under or around the front and the back windshield, tend to experience extremely high surface heating when such vehicles are parked in non-shaded areas and during the summer months in many parts of the world. The exposed surfaces of the automotive interior parts are known to reach temperatures in excess of 100° C., especially in tropical and equatorial regions of the world. Many automobile OEMs have specified stringent performance requirements to address the durability of automotive interior parts exposed to such high service temperatures.

In an effort to address these demands, a number of composite materials have been developed, including glass mat thermoplastic (GMT) composites. GMT composites provide a number of advantages, e.g., they can be molded and formed into a variety of suitable products both structural and non-structural, including, among many others, automotive bumpers, interior headliners, and interior and exterior trim parts. The traditional GMT used in exterior structural application are generally compression flow molded and are substantially void free in their final part shape.

Low density GMT (LD-GMT) used in the interior trim applications are generally semi-structural in nature and are porous and light weight with densities ranging from 0.1 to 1.8 g/cm$^3$ and containing 5% to 95% voids distributed uniformly through the thickness of the finished part.

Problems associated with the prior art is that prior art, mass-produced, injection molded or vacuum formed parts are heavy, suffer from appearance problems and don't have desirable acoustic properties.

Many molded parts are used in the interior of vehicles. The substrate of the part is often made of plastic or preferably of a fibrous molding material.

Natural fiber composite panels utilized as a substrate have very important characteristics because of their light weight and high environmental sustainability.

As described in U.S. patent publication Nos. 2014/0342119 and 2015/0027622, the substrate of the molded part may be realized in a laminar fashion and has an essentially plane contour or a three-dimensional contour with convex and concave regions defined by the respective design, as well as, if applicable, one or more openings and recesses for trim strips and control elements such as pushbuttons, switches and rotary knobs for power windows and exterior rearview mirrors. In order to fix the molded parts in the passenger compartment or on the vehicle door and to mount handles, control elements and storage trays on the molded part, the molded part is also equipped with mounting parts that are also referred to as retainers.

The substrate typically consists of plastics or composite materials that contain plastics such as acrylonitrile-butadiene-styrene (ABS) or polypropylene (PP). Fibrous molding materials on the basis of textile fabrics of hemp, sisal, flax, kenaf and/or wood components such as wood fibers, wood dust, wood chips or paper bound with duroplastic binders are likewise used as material for the substrate. Foamed materials of polyurethane or epoxy resins that, if applicable, are reinforced with natural fibers or glass fibers may also be considered as material for the substrate.

As described in U.S. patent publication No. 2015/0027622, an interior covering part is produced which comprises a substrate or a carrier part component and a decorative film or a decorative layer. For producing the interior covering part, a substrate of fiber molding material, in particular, a natural fiber molding material, and a decorative film or a decorative layer are formed in two steps, wherein these are pressed together in a first step of the two steps and in particular hot-pressed.

As starting material or semi-finished product for a substrate, which is used for producing the carrier component, a fiber molding material in the form of a plastic mat with fiber components and especially a polypropylene (PP)-bound fiber mat with natural fibers and/or plastic fibers, a polypropylene (PP)-bound fiber mat with ceramic, carbon or glass fibers is used especially. This (substrate) can be plasticisable, in particular, through the supply of heat. When using a polypropylene (PP)-bound fiber mat as substrate, this preferentially comprises a material component of a fiber material, which is preferentially formed of natural fibers or glass fibers as well as plastic or carbon fibers and, in particular, with polypropylene (PP)-fibers (binding function). Alternatively or additionally natural fiber PP (NFPP) or glass fiber PP can be used as fiber mat. As natural fibers, fibers of wood, kenaf, hemp, jute, flax, china grass, rattan, soya, ocra, banana, bamboo, coconut, coir, cotton, curaua, abaca, pine, pineapple, raffia palm and/or sisal can be used. Synthetic fibers can also be used. Chips of wood can also be used as starting material for the carrier material. As synthetic fibers, carbon fibers, fibers of polyester, acrylate, aramide, Twaron, Kevlar, Technora, vinylon, Cylon and/or polypropylene can be used. A combination of a plurality of types of the mentioned natural fibers or other fibers can also be used in the substrate. As part of the present invention, the term "polymers" comprises both homopolymers as well as copolymers of the mentioned polymer types U.S. patent publication No. 2013/0052412 discloses a vehicular trim component made by concurrent compression forming and injection molding.

The side of the respective molded part or substrate that faces the vehicle interior is usually referred to as the visible side. In order to provide the visible side with an attractive appearance, the substrate is equipped with one or more decorative elements of a textile material or a plastic film. The plastic films used for this purpose are usually colored and have a relief-like embossed surface. If applicable, the decorative elements comprise a cushioning layer of a foamed plastic that faces the substrate and provides the molded part with pleasantly soft haptics. The decorative elements are usually laminated onto the substrate or bonded thereto during the manufacture of the substrate by means of thermoplastic back-injection molding.

On its edge and/or on an installation side that lies opposite of the visible side, the substrate is advantageously equipped with projections, depressions and bores. The projections, depressions and bores serve for non-positively connecting the molded part to sections of the car body such as a car door or the roof of a passenger compartment by means of retaining elements such as clips, pins and screws.

The respective mounting parts or retainers are made of plastic or a metallic material such as sheet steel and mechanically connected to the substrate by means of retaining elements such as pins, screws or clips or by means of interlacing, clawing or clamping. Retainers advantageously comprise claws and/or clips as integral components. The claws and clips are respectively provided for engaging into recesses of the substrate or for being bent around the edge of the substrate, as well as for being fixed by means of clamping, during the installation of the retainers.

Different methods that typically comprise two or more production steps are known for the manufacture of molded parts for the interior trim of vehicles.

According to one known method, a substrate is initially produced of a fibrous molding material by means of hot-pressing. Subsequently, retainers are attached to the installation side of the substrate, e.g., by means of friction welding or bonding. In a third step, one or more decorative elements are laminated onto the visible side of the substrate. In a simplified two-step variation of the method, retainers of a metallic material with integrated retaining elements, particularly with claws, are compressed together with the fibrous molding material, wherein the retaining elements penetrate into the fibrous molding material and non-positively anchor the retainers on the substrate after the fibrous molding material has cured.

According to another known method, a substrate is manufactured of a thermoplastic by means of injection molding, particularly by means of back-injection molding. One or more decorative elements are preferably arranged in a back-injection mold and back-injected with the thermally plasticized plastic. After the molten plastic has cooled and solidified, the decorative elements are non-positively bonded to the substrate. In another step, mounting parts or retainers are respectively mounted on the installation side of the substrate.

One example of a surface texture is disclosed in WO 2010/080967 A1, according to which an interior trim panel of fibrous molding material is equipped with a smooth, transparent, liquid-impermeable, scratch-resistant and UV-resistant coating of a material, preferably a thermoplastic polymer, with a melting point in the range of 60° to 170° C. The coating is applied by means of hot-pressing, wherein the material of the coating partially sinks into the fibrous molding material such that the coating is non-positively connected to the fibrous molding material.

As described in U.S. Pat. No. 5,462,421 and U.S. patent publication No. 2004/0150127, current vehicle inner door panels comprise laminates of various types. In some inner door panels, a structural backing material is covered by an embossed covering, which is often vinyl. These panels are formed by bonding the covering to the backing in a mold which embosses the covering. Sometimes a filler material, such as cellulose or a foam sheet, is bonded between the backing and covering. After bonding, the periphery of these panels must be trimmed before vehicle installation. In the past, this trimming has been usually accomplished in a separate trim fixture.

The industry has developed a mold apparatus wherein the laminate is formed in a mold that also includes external trimming knives that provide a finished panel ready for vehicle installation. Such apparatus is shown in U.S. Pat. No. 4,692,108 to Cesano. All of the materials used in forming the Cesano type of laminated panel are preformed.

Another type of inner door panel in use is a laminate comprising a structural substrate of reinforced foam covered by a vinyl covering. This type of laminate is formed by placing the vinyl and reinforcing material in a mold and thereafter injecting foamable materials, which expand, set up and cure in the mold. After curing, this unfinished laminate requires further processing before it is ready for vehicle installation. It is removed from the mold and transferred to a trim fixture, where it is finally trimmed by accurately cutting the periphery with a water jet or the like.

Some problems attend this post-formation trimming operation. For example, the unfinished panel must be accurately positioned in the fixture. If it is not, the final panel will be out of dimension and unusable. Such a panel must be scrapped. Also, this post-formation trimming operation requires additional handling, equipment and labor.

U.S. Pat. No. 8,833,829 and 2012/0091698 disclose polymer skin/foam bilaminate sheets. These all-olefin sheets are low cost, low weight, recyclable sheets which can be formed into vehicle interior components.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance. Facing materials are widely used in motor vehicle construction.

In the automotive industry, it is common practice to refer to various surfaces as being A-, B-, or C-surfaces. As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors, examples include dashboards, door panels, instrument panels, steering wheels, head rests, upper seat portions, headliners, load floors and pillar coverings. Examples are shown in FIG. 1.

As described in U.S. patent publication 2014/0225296, one problem associated with one method of making a panel of sandwich-type composite structure is that during the cold-pressing in a compression mold one or both of the skins does not fully contact or achieve abutting engagement with its respective mold half or die during the molding process. Consequently, the resulting compression-molded, composite component fails to achieve the desired component shape, as defined by the opposing surfaces of upper and lower dies.

The following U.S. patent documents are related to at least one embodiment of the present invention: U.S. Pat. Nos. 5,324,384; 5,352,397; 5,370,521; 5,502,930; 5,506,029; 5,614,285; 5,718,791; 5,746,870; 5,915,445; 6,050,630; 6,102,464; 6,435,577; 6,537,413; 6,544,449; 6,655,299; 6,682,675; 6,682,676; 6,695,998; 6,748,876; 6,790,026; 6,823,803; 6,843,525; 6,890,023; 6,981,863; 7,090,274; 7,419,713; 7,909,379; 7,919,031; 8,117,972; 10,166,704; 10,279,512; 10,532,499; 2003/0194542; 2005/0189674; 2006/0255611; 2008/0185866; 2011/0281076; 2011/0315310; 2013/0260112; 2013/0273191; and 2015/0321396.

The following U.S. patent documents are also related to at least one embodiment of the present invention: 2014/0077518; 2014/0077530; 2014/0077531; 2015/0130220; 2015/0130221; 2015/0130221; and 2017/0043687.

In-mold coatings were used in the late 1980s for automotive applications, specifically window encapsulations and steering wheels. They used an aliphatic urethane foam substrate with a solvent-borne lacquer or two-component urethane. With the advent of lower-cost aromatic elastomers in the late 1990s, a higher emphasis has been placed on converting interior automotive parts from PVC to in-mold applications, which increases throughput and improves appearance. Currently, the following components are being prepared using in-mold processes: instrument panels, door panels, steering wheels, airbag covers, armrests, assist handles, headrests and seat covers (see FIG. 1). The in-mold processes used are polyurethane sprayable elastomer, injected polyurethane elastomer and polyurethane foam. Most of these applications utilize waterborne in-mold coatings.

The in-mold process allows for a quicker processing time and takes up less space than a post-paint application. Most post-paint applications require between 40 and 60 minutes to process and require power wash equipment, spray lines and ovens. The plastic in these applications requires cleaning, degreasing and priming before it can be painted with a topcoat. Even with this extensive preparation, defects are very common and costly to the finisher. Post-paint applications require skill and finesse to properly apply the coatings, and still surface defects such as picture framing, sagging, orange peel, craters and dirt contamination commonly occur. The post-paint process also requires that ovens be maintained at proper temperatures to appropriately cure the post-paint finish; a delicate and energy-intensive proposition.

The mold-in process allows for parts to be molded and coated in a one-step process so that finishers do not have to use multiple steps to mold and paint the part. This eliminates many plastic preparation costs (cleaning, degreasing, priming, sanding, flame treating, etc.) and uses less packing and shipping, less labor, and produces less waste, thereby generating a substantial cost savings for the finisher.

The cycle time to produce a steering wheel or instrument panel (IP) skin with an in-mold coating can range from three and a half to five minutes, depending on the mold temperature and the type of elastomer. The part and the in-mold coating are fully cured and chemically bonded to one another during the molding process, eliminating the need for bake ovens as in post-painted parts.

With an in-mold paint application, the visible coating surface will appear as an exact replica of the mold tool. Therefore, by using this application, defects such as picture framing, sagging, cratering and orange peel are inherently eliminated. As long as the mold surface is clean and the equipment settings for the mold temperature are correct, the in-mold coating will dry shortly after as it comes in contact with the tool.

Waterborne in-mold coatings allow for the use of lower-VOC coating due to the application of the coating to a hot tool. Typical solvents used for coalescence and appearance control during the curing process are not necessary. The VOCs of the waterborne in-mold coatings can range from 0.4-1.8 lb/gal, depending on the type of coating. A flexible waterborne in-mold coating will contain 0.4-0.7 lb/gal VOC, while a soft, "leather-like-feel" two-component coating will run in the 0.8-1.8 lb/gal VOC range. Post-paint waterborne coatings can range from 1.2-2.8 lb/gal VOC.

The primary concerns when using in-mold coatings are flash time and a condition known as "Wet IMC." Wet IMC happens when blistering and delamination occur between the coating and the substrate. This condition can arise from short flash time, high DFT or poor application. Wet IMC most generally occurs when the coating is applied too heavily in a single pass. Solvent becomes trapped in the coating, which results in blistering and poor adhesion between the substrate and the paint film. This can be corrected by first selecting equipment that will properly atomize the coating, and then using multiple passes to slowly build to the desired DFT, thus eliminating issues associated with wet IMC.

It is common to see pinholes and imperfections in post-paint applications when evaluating the film closely under magnification. As stated earlier, in-mold coatings do not utilize low levels of coalescing solvents. In an in-mold application, slow solvents are ineffective at coalescing and facilitating flow-out over a hot tool because the coating hits the mold and dries almost immediately on contact, resulting in very little flow. The excellent film quality is achieved then, not by the typical flow and coalescing manner but by applying the coating with multiple passes and good atomization so that the paint film is uniform and free of blisters and pinholes.

Listed below is a step-by-step process description for producing a finished part by the above-noted in-mold process.

Polyurethane Spray Skin (Instrument Panel)

1. The mold is heated and kept at a constant temperature of 160+/−5° F. through water circulation.

2. Mold release is applied (15-30 sec.) followed by a 10-30 sec. flash. The mold release can be semi-permanent or sacrificial (one release/application). Sacrificial-type release may be preferred due to ease of release, low gloss and part-to-part gloss consistency.

3. Coating is applied at 0.8-1.5 mils to the top and bottom of the tool (60 sec.), followed by a 10-60 sec. flash.

4. Two-component polyurethane (PU) elastomer is applied to the tool at approximately 1.0 mm thickness (60 sec.).

5. The skin is allowed to cure in the tool for 60 sec. prior to demolding.

6. The skin is prepared for the next station (backing).

In addition to processing advantages, in-mold coatings offer other advantages over post-painting. Complex part designs can be processed without the worry of part shrinkage, gloss control or marring. The in-mold process with aromatic polyurethane allows the designer to integrate multiple components in the part. This can be a one-piece steering wheel/airbag unit, or an integrated passenger side airbag on spray PU IPs. The parts produced from the in-mold process yield exact duplication of the grain, finish and styling detail of the mold. There is no loss in shape or shrink-back after de-molding due to the fully relaxed state of the polymer in the finished, cured skin. The skin is formed in its desired shape at the time of molding. There is no forming or stretching of the skin, which occurs in the competing process of thermoforming. The thermoforming process causes stretching of the material, which results in a loss of grain definition. It changes the surface tension, which can lead to adhesion problems for the post-paint. Also, delamination often occurs over time due to shrink-back.

Most post-paint applications can only achieve low gloss levels by overloading the coating with inorganic fillers. This results in a degradation of film properties such as the coating mar resistance. With in-mold coatings the tool grain and finish can be manipulated to achieve a wide range of gloss levels. It is possible to achieve a 1-2 gloss by tool/finish design and mold release selection. No manipulation of the in-mold coating by addition of flattening agents or texturing agents is necessary to achieve the desired gloss.

The texture or grain of the mold dictates the gloss of the final coating film. The smoother or more polished the mold, the higher the gloss of the coating. For an in-mold application, the amount of flatting agent used has virtually no effect on the gloss. However, the amount of flatting agent has a major effect on the gloss with a post-paint system. The mold release used in an in-mold system can also have a minor effect on the final gloss of the coating.

The mold release used can affect the final gloss of the coating by as much as 5°. The polymer choice for the coating has an effect on the coating gloss and the control of that gloss over different textured or grained surfaces.

The in-mold process is also much better suited for two-tone applications than post-paint applications. With in-mold processes, applying two colors can be performed in the initial painting step with only a slight increase in the processing time.

The following U.S. patents assigned to Red Spot Paint and Varnish Co. Inc. of Evansville, Ind., disclose various in-mold coated products such as vehicular components, in-mold coating methods, and in-mold coating compositions, involving the use of aqueous acrylic copolymer dispersions, desirably self-crosslinking: U.S. Pat. Nos. 9,296,130; 8,986,593; 9,539,745; and 10,144,157.

SUMMARY

An object of at least one embodiment of the present invention is to provide an automated manufacturing method and system and high quality, in-mold coated plastic articles produced thereby wherein the articles look like painted injection molded articles and wherein cycle time and labor costs are reduced.

In carrying out the above object and other objects of at least one embodiment of the present invention, an automated method of manufacturing a coated plastic article is provided. The method includes the steps of providing a mold for making the article. The mold has upper and lower mold halves. One of the mold halves has a mold surface which at least partially defines an article-defining cavity. The method also includes coating at least a portion of the mold surface with an in-mold coating composition and placing a heated blank of moldable plastic sheet material between the upper and lower mold halves. The blank has inner and outer surfaces. The method further includes forcing an inner portion of the heated blank into the article-defining cavity so that the outer surface of the blank is in contact with at least a portion of the in-mold coating composition. Then the in-mold coating composition and the inner portion of the blank are caused to cure and bond to one another. Then a plastic compatible with the plastic of the sheet is molded to form at least one component on the inner surface of the sheet so as to form the coated plastic article.

The plastic sheet material may be a composite plastic sheet material.

The coating may have a textured, class "A" surface.

The step of forcing may be performed in a single stamping stage.

The composite plastic sheet material may comprise a plurality of fibers dispersed within a thermoplastic resin.

The thermoplastic resin may be selected from polyolefins, thermoplastic polyolefin blends, polyvinyl polymers, diene polymers, polyamides, polyesters, polycarbonates, polyestercarbonates, styrene-containing polymers, acrylic polymers, polyimides, polylphenylene either, polyphenylene oxide, polyphenylene sulphide, polyethers, polyetherketones, polyacetals, polyurethanes, polybenzimidazole, and copolymers or mixtures thereof.

The fibers may be selected from glass fibers, carbon fibers, synthetic organic fibers, natural fibers, mineral fibers, metal and/or metalized or coated fibers, or mixtures thereof.

The article may be a decorative, automotive, interior trim article.

The fiber content may be from about 20% to about 80% by weight of the thermoplastic resin.

The article may have a thickness in a range of 1 mm to 10 mm.

Further in carrying out the above object and other objects of at least one embodiment of the present invention, an automated system for manufacturing a coated plastic article is provided. The system includes a combination compression and injection mold having open and closed positions for making the article. The mold has upper and lower mold halves. One of the mold halves has a mold surface which at least partially defines an article-defining cavity. The system also includes a program-controlled first manipulator and an automatic sprayer supported on the first manipulator for movement relative to at least two control axes for spraying at least a portion of the mold surface with an in-mold coating composition. The system further includes a program-controlled second manipulator and an end effector supported on the second manipulator for movement relative to at least two control axes for picking a heated blank of moldable plastic sheet material from an oven and placing the heated blank between the upper and lower mold halves. The other one of the mold halves forces an inner portion of the heated blank into the article-defining cavity and into contact with at least a portion of the in-mold coating composition. The mold halves cause the in-mold coating composition and the inner portion of the blank to cure and bond to one another in the closed position of the mold. A plastic compatible with the plastic of the sheet is injected into the article-defining cavity to form at least one component on the outer surface of the sheet and so as to form the coated plastic article in the closed position of the mold.

Each of the manipulators may be a robot.

Still further in carrying out the above object and other objects of at least one embodiment of the invention, an in-mold coated plastic article is provided. The article includes a rigid, molded substrate of compression-moldable, plastic sheet material. The substrate has inner and outer surfaces. A coating is adhered to the outer surface of the substrate. The coating is formed in-mold with the substrate. The at least one component is adhered to the inner surface of the substrate. The at least one component is formed in-mold with the substrate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, at least one embodiment of the present invention deals with the development of an automated method of and system for compression molding plastic sheet material with an in-mold coating 8 to form an in-mold coated plastic article, generally indicated at 10. The sheet material may be porous, fiber-reinforced thermoplastic sheet material. The method of the at least one embodiment allows one to compression mold heated blanks 9 (FIGS. 4 and 5) of moldable, plastic sheet material with a cost and cycle time that can be used for automotive and other high volume applications. The method of the present invention requires only a single stamping step or stage.

The composite thermoplastic sheet material preferably comprises a plurality of discontinuous or continuous fibers dispersed within a thermoplastic resin. The thermoplastic resin is preferably selected from polyolefins, thermoplastic polyolefin blends, polyvinyl polymers, diene polymers, polyamides, polyesters, polycarbonates, polyestercarbonates, styrene-containing polymers, acrylic polymers, polyimides, polylphenylene ether, polyphenylene oxide, polyphenylene sulphide, polyethers, polyetherketones, polyacetals, polyurethanes, polybenzimidazole, and copolymers or mixtures thereof.

The fibers are preferably selected from glass fibers, carbon fibers, synthetic organic fibers, natural fibers, mineral fibers, metal and/or metalized or coated fibers, or mixtures thereof. The fibers may be selected from polyaramid fibers, polyester fibers, nylon fibers, hemp fibers, sisal fibers, basalt fibers, steel fibers, aluminum fibers, copper fibers, zinc fibers, or mixtures thereof.

The composite sheet material preferably has a porosity between about 5% to about 95% by volume and an areal density of from about 400 $g/m^2$ to about 4000 $g/m^2$. The fiber content is preferably from about 20% to about 80% by weight of the thermoplastic resin.

Figure 1:
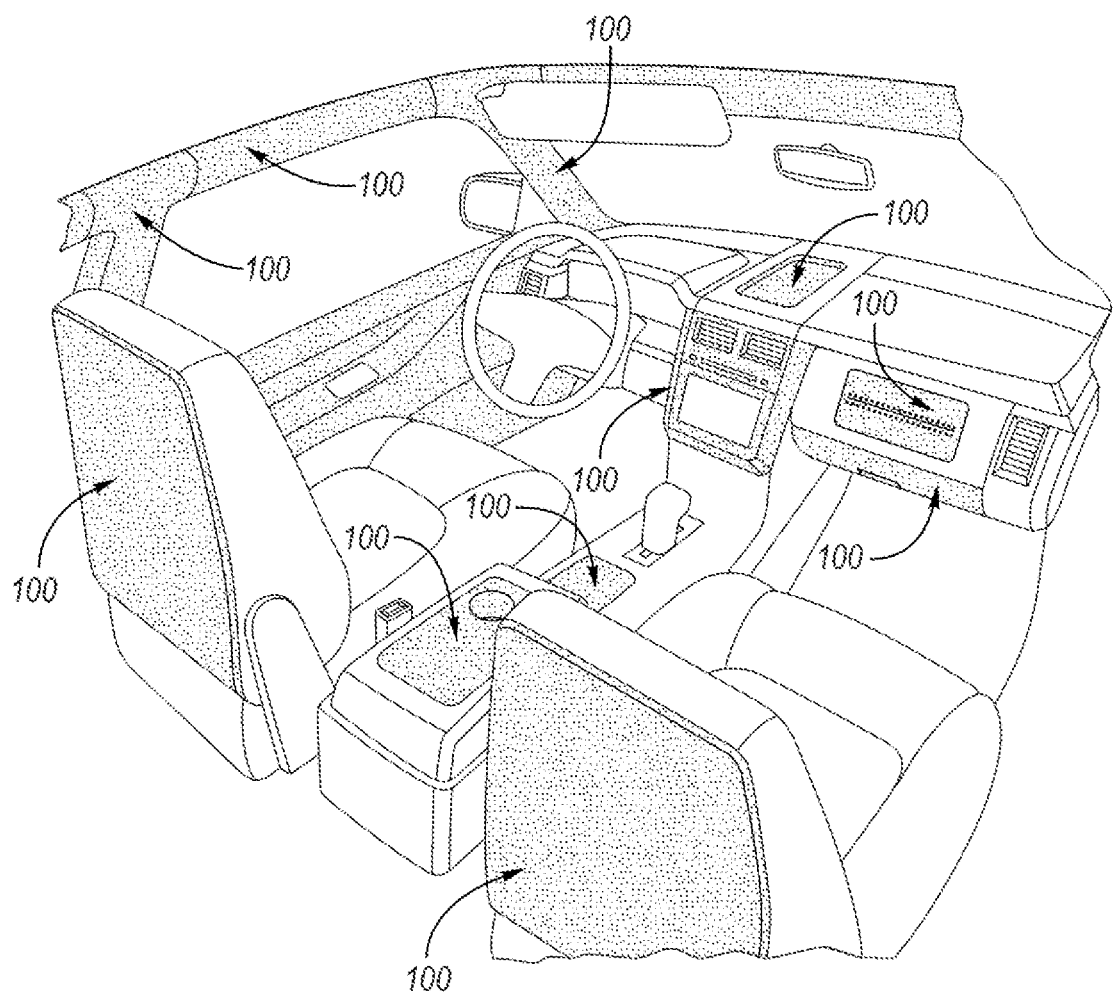
FIG. 1 is a view, partially broken away, of an automotive interior wherein possible locations of a decorative interior trim part constructed in accordance with at least one embodiment of the present invention are indicated by arrows 100.
Figure 2:
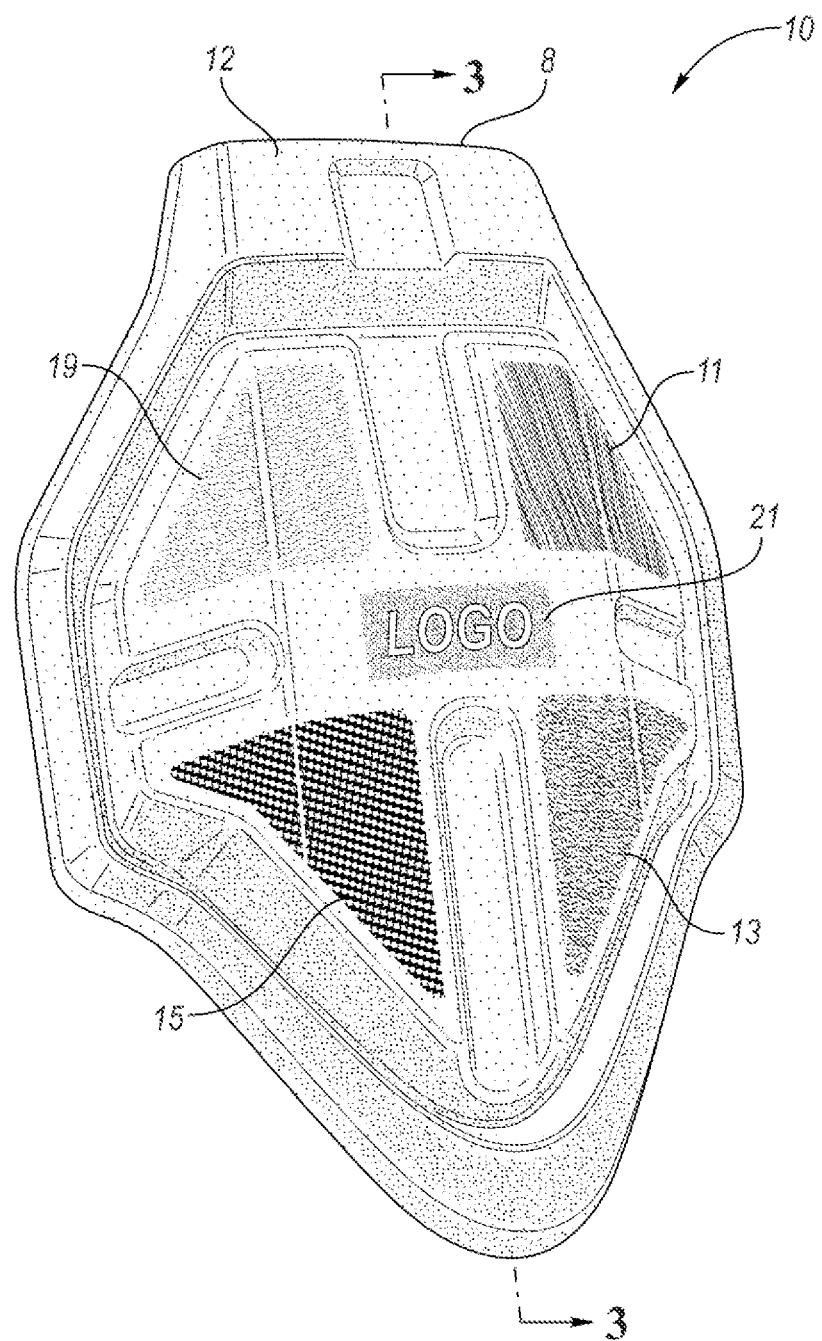
FIG. 2 is a front perspective view of a decorative, automotive interior trim part or article constructed in accordance with at least one embodiment of the present invention.
Figure 3A:
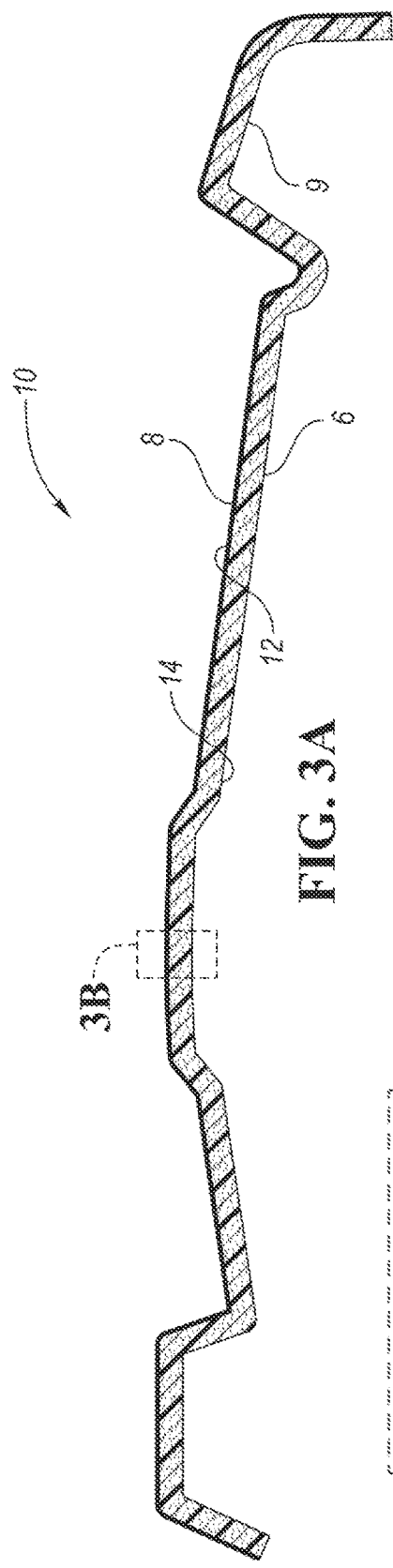
FIG. 3A is a sectional view of the part of FIG. 2 taken along lines 3-3 of FIG. 2.

At least one embodiment of the present invention provides a method of and system for making a laminated trim component, such as vehicle, interior trim component, generally indicated at 10 in FIG. 2. Exemplary locations for such articles are indicated in FIG. 1 by arrows 100. The article 10 has an outer "A" surface 12 (FIGS. 2 and 3B) and an inner "B" surface 14 (FIG. 3A). The "A" surface 12 may be textured as indicated in FIG. 2 to look like a grained, injection molded part. Examples of such textures include a "wood grain" texture 11, a leather grain texture 13, a carbon fiber texture 15, a natural fiber texture 19 and a texture 21 which provides a "logo" or other desired decorative design. As is well known in the art, the texture of the in-mold, coating 8 is typically provided by the surfaces of the article-defining cavity (62, 62') of a female die (60, 60') of a molding machine.

Figure 3C:
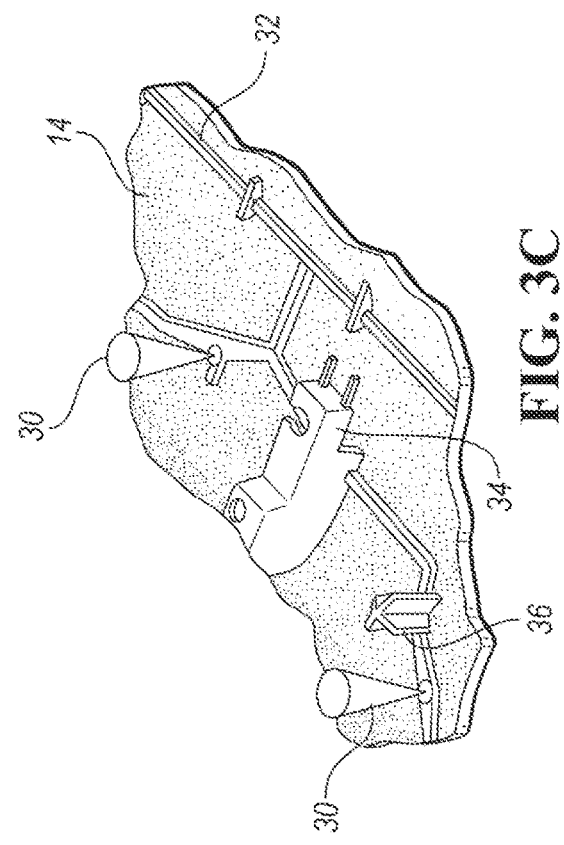
FIG. 3C is a rear perspective view, partially broken away, of the part of FIG. 2 after injection molding.
Figure 3B:
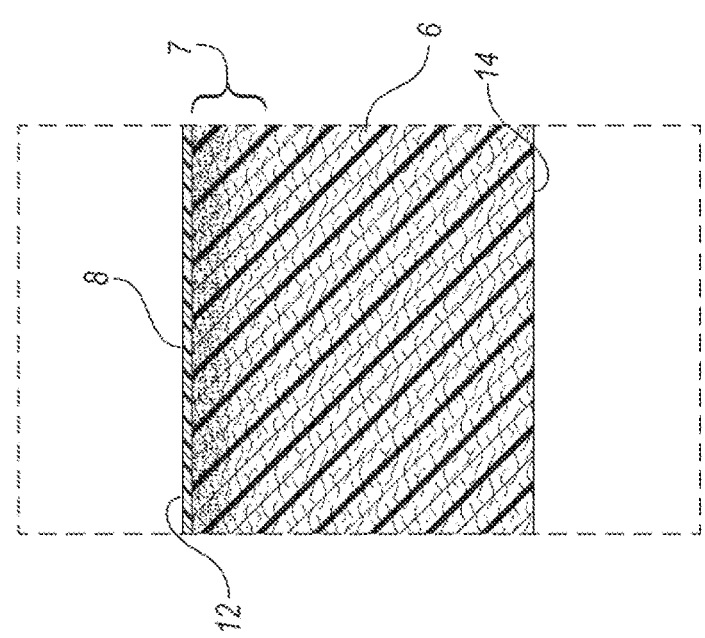
FIG. 3B is an enlarged view of a portion of the part of FIG. 3A taken within a dashed box labeled 3B.

Referring specifically to FIGS. 3A and 3B, during the above-noted compression molding process, the thermoplastic which serves as a matrix to the fibers forms an adhesive layer 7 to chemically bond the substrate 6 (i.e. the blank 9) to the coating 8 formed from the in-mold coating composition. The heat and pressure in the article-defining cavity (62, 62') causes the thermoplastic to migrate through the fibers so that the concentration of the thermoplastic is greater at the interface between the coating 8 and the substrate 6 than the concentration of the thermoplastic at other locations in the substrate 6 as indicated by the relative "darkness" of the adhesive layer 7 compared to the "darkness" of the rest of the substrate 6.

Referring now to FIG. 3C, the article 10 may also include a plurality of components which are made from plastic resin which initially flows from injection molding "drops" 30 to form stiffening ribs 32, receptacles 34 and posts 36 to provide attachment locations for various automotive components including wiring harnesses, etc. on the "B" surface 14 of the article 10.

Figure 4:
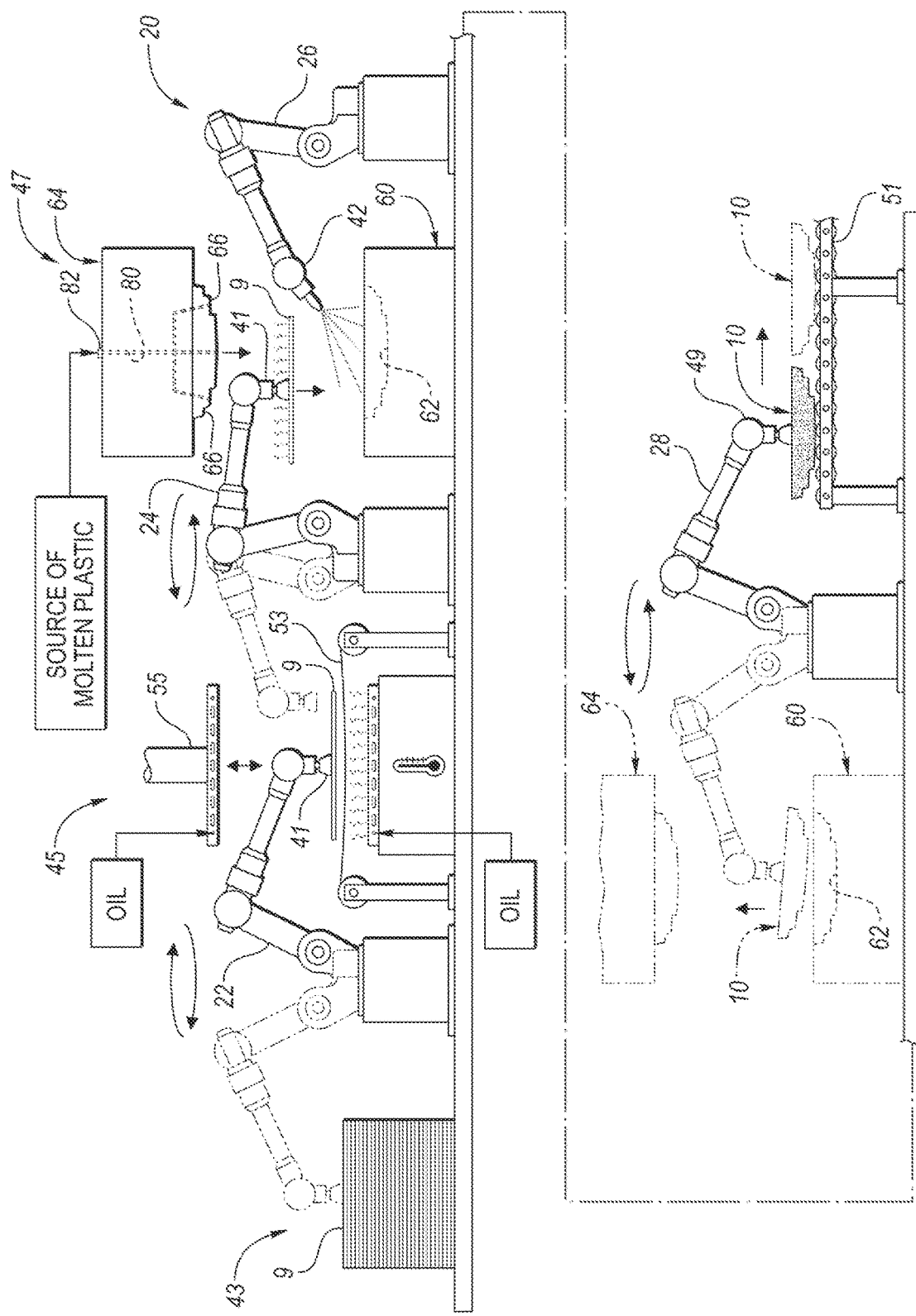
FIG. 4 is a side schematic view illustrating an automated manufacturing method and system of at least one embodiment of the present invention for making parts such as the part of FIGS. 1-3C.
Figure 5:
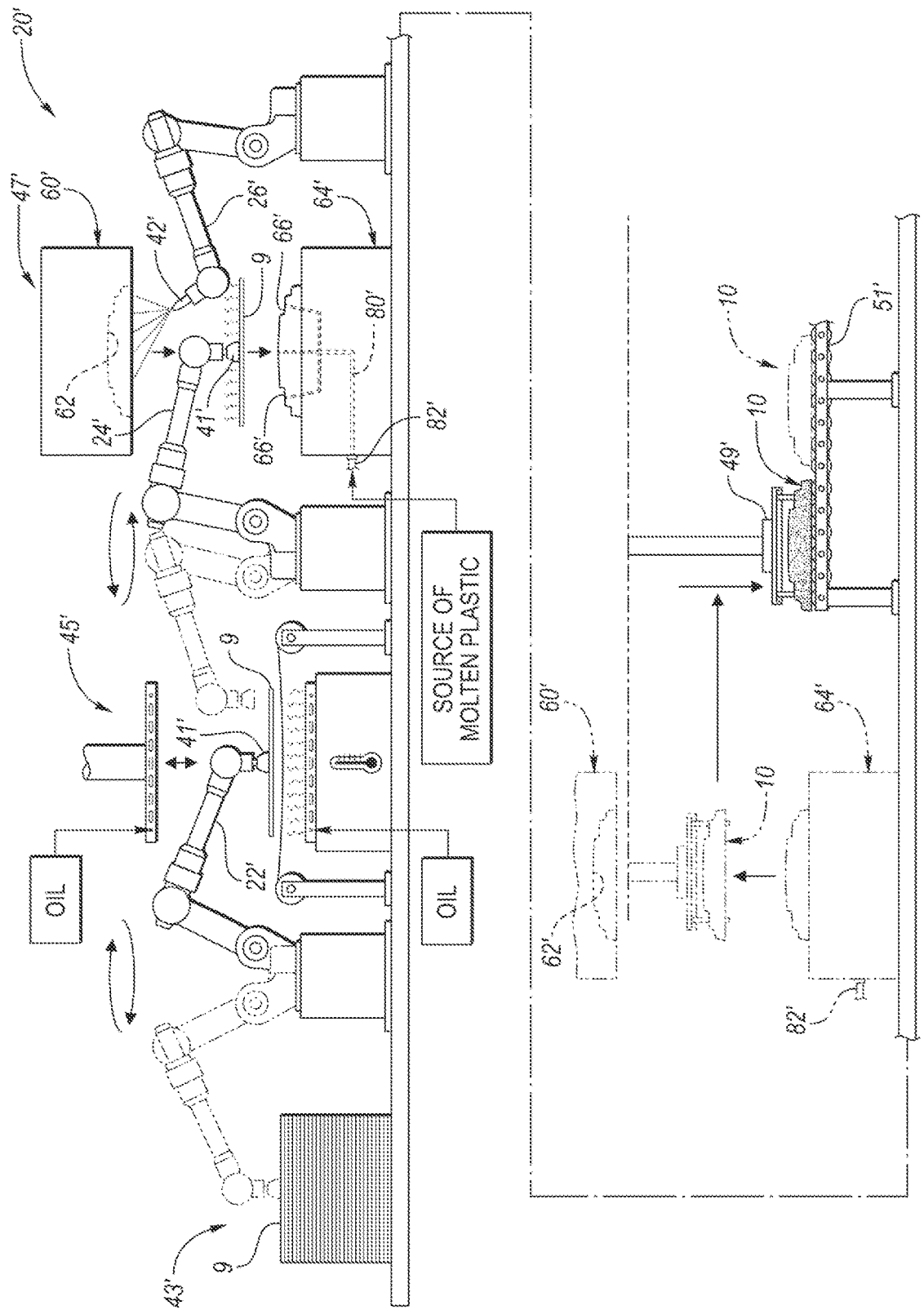
FIG. 5 is a view, similar to the view of FIG. 4, but illustrating a different embodiment of the method and system.

A system constructed in accordance with two embodiments of the present invention is generally indicated at 20 and 20' in FIGS. 4 and 5, respectively. The parts or components of the system 20' which are the same or similar to the parts or components of the system 20 in either structure or function have a single prime designation.

The system 10 includes a plurality of program-controlled manipulators or robots 22, 24, 26 and 28. The robots 22 and 24 have the ability to pick up unheated and heated blanks 9 within a specified range of allowable blanks using multiple, end-of-arm, tooling or grippers 41. The robots 22 and 24 pick up and orient the unheated and heated blanks, respectively, at load, heating and molding stations 43, 45 and 47, respectively.

The robot 26 has an automatic sprayer 42 for spraying an in-mold coating composition, for example, one provided by Red Spot Paint and Varnish Co. Inc. of Evansville, Ind. The robot 28 has an end-of-arm tooling or end effector 49 to pick up a finished article 10 at the molding station 47 and place the finished article 10 on a conveyor 51.

The robots 20, 24, 26 and 28 are preferably multi-axis robots and are preferably vision-guided by cameras (not shown) located on or adjacent the robots. The robot 22 may be vision-guided to identify, pick, orient, and present the blanks 9 "bottom down" so that they are supported on a belt 53 within an oil-heated oven 55 at the heating station 45. The grippers 41 and 49 accommodate multiple blank and part families, respectively.

Benefits of Vision-based Robot Automation include but are not limited to the following:
  Smooth motion in high speed applications;
  Handles multiple blanks and parts;
  Slim designs to operate in narrow spaces;
  Integrated vision; and
  Dual end-of-arm tooling or grippers 41 and 49 designed to handle multiple blank and part families.

A master control station or system controller (not shown) determines locations and orientations of the blanks 9 of moldable plastic sheet materials, heated blanks, and finished articles 10, using any suitable machine vision system having at least one camera. Any one or more of various arrangements of vision systems may be used for providing visual information from image processors to the master controller. The vision system may include three-dimensional stationary cameras or robot-mounted cameras that provide light over fields of vision or view, creating a stripe of light (or other pattern) across the blanks or finished articles as they pass under the cameras. In various embodiments, the light may be a laser beam. The cameras, their image processors and the master controller may be configured to locate various features such as holes. Alternatively, or in addition, the master controller may register the contours of the finished article 10 based on the various depths of the light on the surfaces of the article 10.

In some embodiments, multiple cameras can be situated at fixed locations on a frame structure (not shown) at the stations 43, 45 and 47 or may be mounted on the arms of the robots 22, 24, 26 and 28. Cameras may be spaced apart from one another on the frame structure. The cameras are typically operatively connected to the master controller via their respective image processors. The master controller also controls the robots 22, 24, 26 and 28 of the system 10 through their respective robot controllers (not shown). Based on the information received from the cameras, the master controller then provides control signals to the robot controllers that actuate robotic arm(s) of the robots 22, 24, 26 and 28 used in the system 10.

The master controller at the master control station can include a processor and a memory on which is recorded instructions or code for communicating with the robot controllers, the vision systems, the robotic system sensor(s), etc. The master controller is configured to execute the instructions from its memory, via its processor. For example, the master controller can be a host machine or distributed system, e.g., a computer such as a digital computer or microcomputer, acting as a control module having a processor and, as the memory, tangible, non-transitory computer-readable memory such as read-only memory (ROM) or flash memory. The master controller can also have random access memory (RAM), electrically-erasable, programmable, read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the master controller can include all software, hardware, memory, algorithms, connections, sensors, etc., necessary to monitor and control the vision subsystem, the robotic subsystem, etc. As such, a control method can be embodied as software or firmware associated with the master controller. It is to be appreciated that the master controller can also include any device capable of analyzing data from various sensors, comparing data, making the necessary decisions required to control and monitor the vision subsystem, the robotic subsystem, sensors. etc.

An end effector on each robot arm of the robots 22, 24 and 28 may include a series of grippers supported to pick up the heated and un-heated blanks as well as the finished articles. The robotic arm is then actuated by its controller to pick up the heated or un-heated blank or the finished article with the particular gripper. The robot arm of the robot 28 puts the finished parts 10 on the conveyor 51 after positioning its gripper 49 relative to the article 10 using the determined location from the visual position data of the particular vision subsystem including its camera and image processor.

The composite blank or sheet 9 is heated in the oven 55 while on the belt 57 to a first softening temperature. The composite sheet 9 is stretchable when heated to the first softening temperature.

As shown in FIG. 4, the system 10 also includes a female die, generally indicated at 60, having an article-defining cavity 62 defined by inner surfaces of the female die 60. The female die 60 is typically positioned on a lower base member of a press (not shown). The system 10 also includes a male die, generally indicated at 64, typically mounted on a movable member of the press for forcing an inner portion of a heated blank 9 of thermoplastic material into the female die 60 in a direction along a substantially vertical axis and against the previously sprayed in-mold material. The stamping press including the upper moveable member forces the male die 64 including protrusions 66, into the female die 60 which is supported on the lower base member of the stamping press.

In the embodiment of FIG. 5, the positions and movements of the male die 64' and the female die 62' are reversed for the reasons noted below.

In one embodiment of the present invention, the method includes placing or positioning a previously heated (in a range of approximately 320° F. to approximately 570° F.) blank 9 of moldable, composite plastic sheet material over the cavity 62 of the female die 60. If the plastic is polypropylene, the temperature may be approximately 400° F. The blank 9 has a predefined position and orientation over the cavity 62. Outer peripheral portions of the blank 9 may be perforated at holes (not shown) to enable the blank 9 to be held at posts (not shown) which extend upwardly through the holes from the outer surface of the female die 60. The posts are removably positioned on the upper surface of the female die 60 to form different patterns or clusters of posts depending on the size and shape of the desired article. In this way, the holding forces at the outer peripheral portions of the heated blank 9 can be varied so that the heated blank 9 stretches but does not wrinkle, tear or rip during a deep-drawn compression molding process. Also, spring-loaded angled clamps (not shown) extend upwardly from the upper surface of the female die 60 to controllably hold outer peripheral portions of the blank 9. The posts and the clamps may be removable or retractable to vary the positions and/or locations at which the outer peripheral portions of the blank 9 are held based on the size and shape of the formed article 10.

The inner portion of the heated blank 9 is forced into the cavity 62 of the female die 60 along the substantially vertical axis and against the now dry, in-mold coating composition or material which had previously been sprayed on the inner surfaces of the female die 60 by the robot 26. The outer portions of the heated blank 9 adjacent the cavity 62 are held by the posts and clamps to resist movement of the outer portions towards the article-defining cavity 62 during the step of forcing so that the deep-drawn material controllably stretches but does not wrinkle, rip or tear during the step of forcing.

Then the male die 60 is retracted in the opposite direction along the vertical axis, and the deep-drawn article is removed from the female die 60 by the robot 28 and any excess material (which typically includes the holes) from the periphery of the deep-drawn article 10 is also removed.

As shown in FIG. 5, the lower mold half 64' may include passages 80' for molding a plastic injected by a nozzle 82' into the lower mold half 64'. The plastic is compatible with the plastic of the composite blank or sheet 9 to bond the plastics together and to form the at least one component such as the components 32, 34 and 36 at the inner surface 14 of the composite sheet 9 (FIG. 3C) at the molding station 47'. Alternatively, as shown in FIG. 4, the upper mold half 64 may have the passages 80 for molding a plastic injected by a nozzle 82.

Also, a robot such as the robot 28 is not shown in FIG. 5 for the sake of simplicity. Rather, only its end effector 49' is shown.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automated method of manufacturing a coated plastic article, the method comprising the steps of:

providing a mold for making the article, the mold having upper and lower mold halves wherein one of the mold halves has a mold surface which at least partially defines an article-defining cavity;

coating at least a portion of the mold surface with an in-mold coating composition;

placing a heated blank of moldable plastic sheet material between the upper and lower mold halves, the blank having inner and outer surfaces wherein the plastic sheet material comprises a plastic resin;

forcing an inner portion of the heated blank into the article-defining cavity so that the outer surface of the blank is in contact with at least a portion of the in-mold coating composition;

causing the in-mold coating composition to cure to form a coating and causing plastic resin of the inner portion of the blank to form an adhesive layer which chemically bonds the blank to the coating; and molding a plastic compatible with the plastic resin of the sheet to form at least one component on the inner surface of the sheet and so as to form the coated plastic article and wherein the article is a laminated article molded as a unitary structure.

2. The method as claimed in claim 1, wherein the plastic sheet material is a composite plastic sheet material.

3. The method as claimed in claim 1, wherein the coating has a textured, class "A" surface.

4. The method as claimed in claim 1, wherein the step of forcing is performed in a single stamping stage.

5. The method as claimed in claim 2, wherein the composite plastic sheet material comprises a plurality of fibers dispersed within a thermoplastic resin.

6. The method as claimed in claim 5, wherein the thermoplastic resin is selected from polyolefins, thermoplastic polyolefin blends, polyvinyl polymers, diene polymers, polyamides, polyesters, polycarbonates, polyestercarbonates, styrene-containing polymers, acrylic polymers, polyimides, polylphenylene either, polyphenylene oxide, polyphenylenesulphide, polyethers, polyetherketones, polyacetals, polyurethanes, polybenzimidazole, and copolymers or mixtures thereof.

7. The method as claimed in claim 5, wherein the fibers are selected from glass fibers, carbon fibers, synthetic organic fibers, natural fibers, mineral fibers, metal and/or metalized or coated fibers, or mixtures thereof.

8. The method as claimed in claim 1, wherein the article is a decorative automotive interior trim article.

9. The method as claimed in claim 5, wherein the fiber content is from about 20% to about 80% by weight of the thermoplastic resin.

10. The method as claimed in claim 1, wherein the article has a thickness in a range of 1 mm to 10 mm.

* * * * *

UNITED STATES PATENT AND TRADEMARK OFFICE
CERTIFICATE OF CORRECTION

| | | |
|---|---|---|
| PATENT NO. | : 11,518,072 B2 | |
| APPLICATION NO. | : 17/109330 | |
| DATED | : December 6, 2022 | |
| INVENTOR(S) | : Heikkila et al. | |

It is certified that error appears in the above-identified patent and that said Letters Patent is hereby corrected as shown below:

In the Claims

Column 14, Lines 36-37, Claim 6:
After "acrylic polymers, polyimides, polyphenylene"
Delete "either" and
Insert -- ether --.

Signed and Sealed this
Second Day of January, 2024

Katherine Kelly Vidal
*Director of the United States Patent and Trademark Office*